United States Patent Office 3,514,262
Patented May 26, 1970

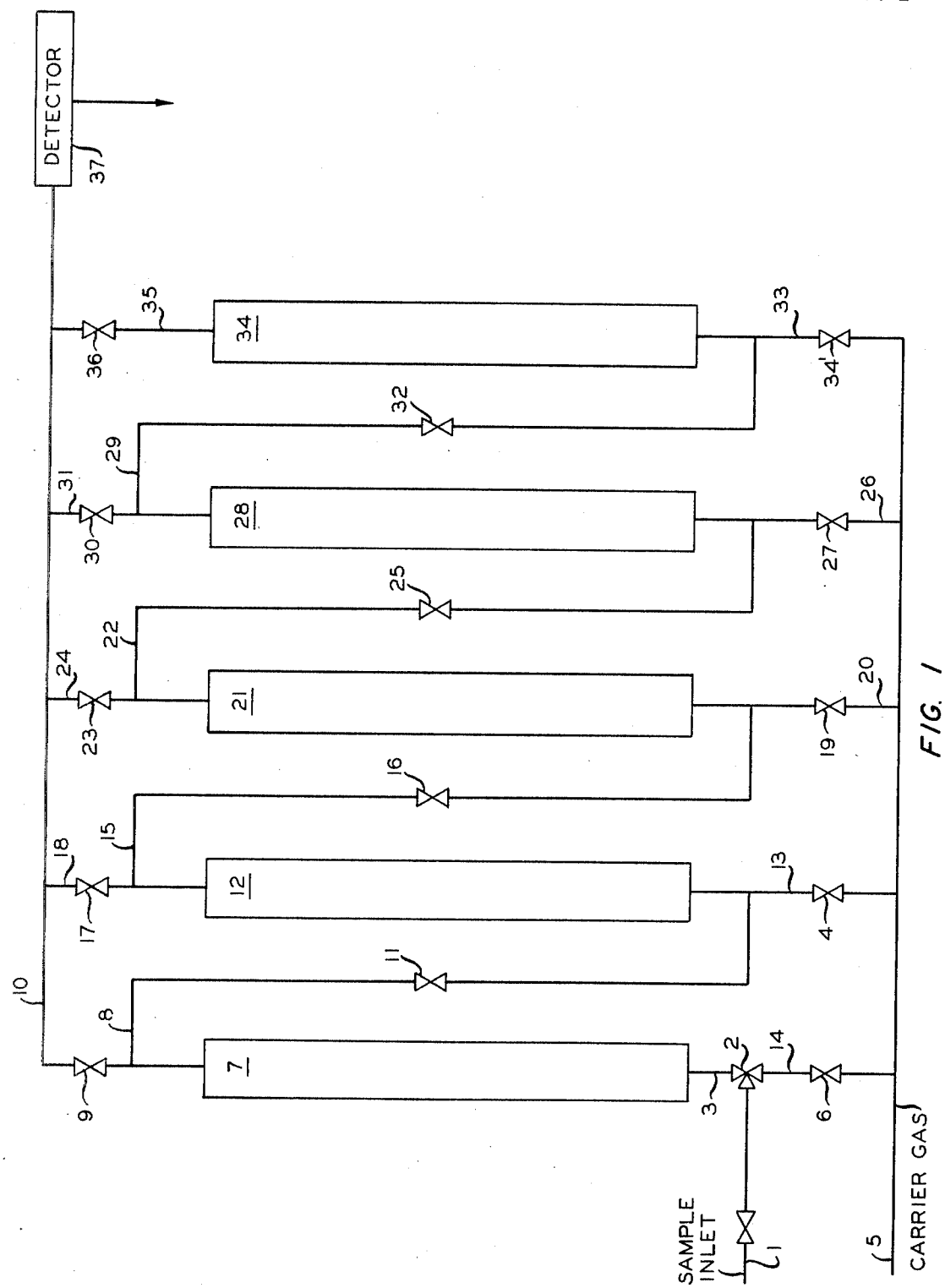

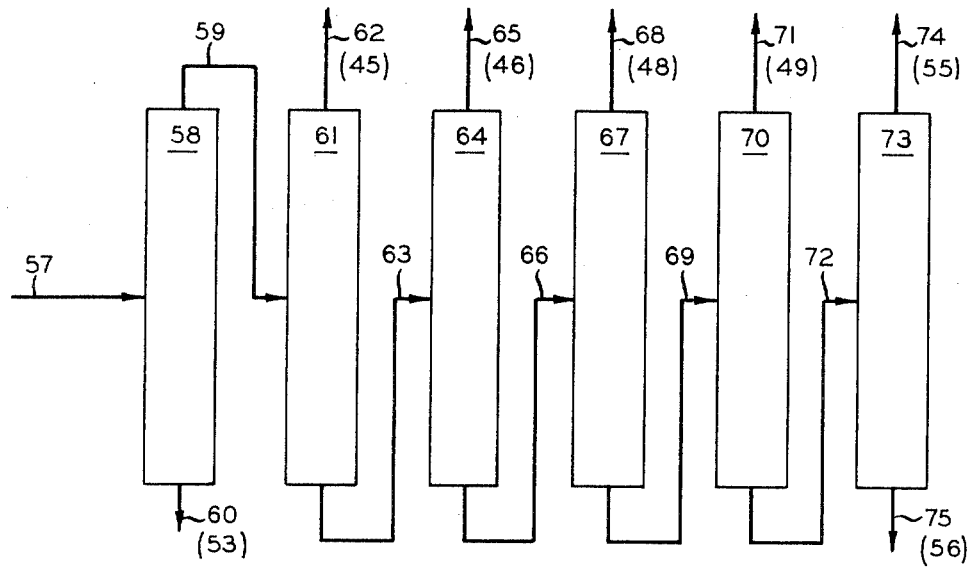
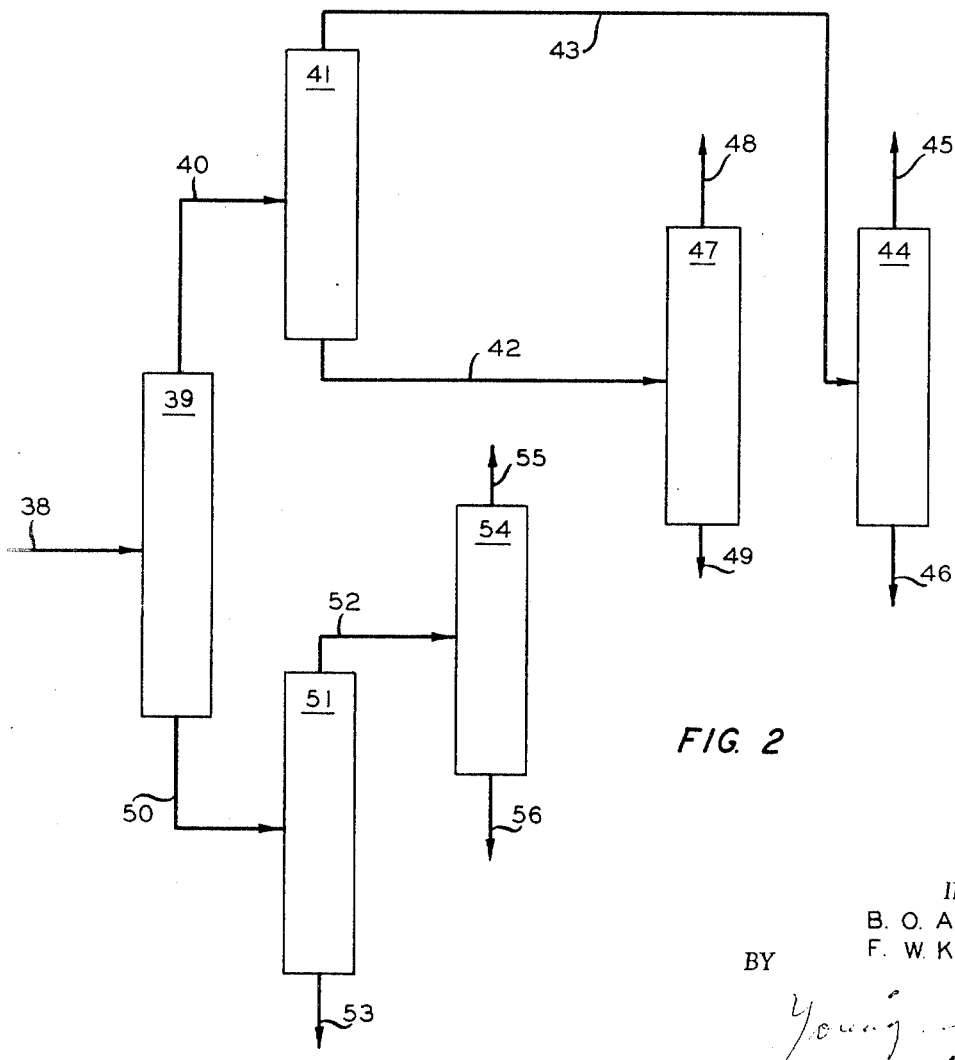

3,514,262
CHROMATOGRAPHIC SEPARATION METHOD
Buell O. Ayers and Francis W. Karasek, Bartlesville, Okla., assignors to Phillips Petroleum Company, a corporation of Delaware
Filed Aug. 29, 1967, Ser. No. 664,014
Int. Cl. G01n 31/08
U.S. Cl. 23—230
7 Claims

ABSTRACT OF THE DISCLOSURE

Multi-component vaporizable mixtures are more effectively separated in multiple separation zones by passing the mixture serially through the several separation zones to retain a fraction in each zone, removing the lowest boiling fraction from the terminal zone, eluting the next lowest boiling fraction from the terminal zone, causing the partial separation of each fraction to at least the next immediate downstream zone, removing a fraction from the next to the last zone, bypassing the terminal separation zone and repeating the cycle until samples have been eluted from each zone.

BACKGROUND OF THE INVENTION

There is need for analytical procedures capable of measuring small concentrations of fluid stream constituents for industrial and laboratory operations. One method of analyzing such streams involves the use of a chromatographic analyzer. In chromatography, a sample of the material to be analyzed is generally introduced, as a vapor into a column containing a selective sorbent or partitioning material. A carrier gas is directed into the column so as to force the sample material therethrough. The selective sorbent, or partitioning material, attempts to hold the constituents of the mixture. This results in the several constituents of the fluid mixture flowing through the column at different rates, depending upon their affinities for the packing material. The column effluent thus consists initially of the carrier gas alone, the individual constituents of the fluid mixture appearing later at spaced time intervals. A conventional method of detecting the presence and concentration of these constituents is to employ a thermal conductivity detector which compares the thermal conductivity of the effluent gas with the thermal conductivity of the carrier gas directed to the column. However, additional analytical techniques such as mass spectrometry, infrared spectrometry, chemical analysis, etc., can be employed for this purpose.

It is very important that the separation of low-boiling and higher boiling components be precise as the detailed analysis of the separated groups of components is complicated by overlapping of components in the separated component groups. Thus, the detailed chromatographic analysis of a $C_8$ or lighter gasoline fraction may require several times as much operating time when a small amount of $C_9$ material is present than when $C_8$ is the highest boiling component of the fraction. The situation is more aggravated still by the presence of even higher boiling component due to this complication which results from the use of conventional, particularly single column, chromatographic apparatus. A complete quantitative analysis of the $C_8$ and lighter fraction cannot be obtained if part of the $C_8$ component remains in the heavier fractions present in the feed where it cannot be quantitatively determined.

Fractional distillation, even in highly developed form, is not practical for sharp separations of the kind required for the purpose indicated, because of the closeness of the boiling points involved and because of the presence of reflux liquid in the fractionating column. To illustrate, the careful fractionation of a naphtha sample in a highly efficient laboratory fractional distillation column nine feet in length and one inch in diameter, and having the equivalent of 200 theoretical plates, required a period of 405 hours to complete, and more than 100 differently boiling cuts were obtained. Even so, much overlapping occurred; for example, approximately 30 of the cuts were found to contain $C_8$ hydrocarbons.

While sharp separations of the kind desired can be obtained by gas chromatography using very small samples, difficulties are encountered when samples are utilized of a size sufficient for further operations (e.g., chemical analysis) which require relatively large quantities. This is because larger diameter columns and greater carrier gas flow rates ordinarily are required with larger samples in order to obtain the desired size. However, such greater carrier gas flow rates interfere with the separation efficiency and the collection and recovery of the separated components, as the components have to be condensed from the hot carrier gas. The increased velocity and quantity of the hot carrier gas hinder the complete condensation and recovery of the components.

It is, therefore, one object of this invention to provide a method for separating wide boiling range mixtures accurately and rapidly while reducing the amount of equipment required. It is another object of this invention to provide a method for separating wide boiling range mixtures which increases the effectiveness of the apparatus employed. It is yet another object of this invention to provide method and apparatus for continuously separating multicomponent vaporizable materials. It is another object of this invention to provide method and apparatus for continuously and countercurrently separating multi-component mixtures. It is yet another object of this invention to provide method and apparatus for continuously and countercurrently separating and analyzing multicomponent mixtures. It is another object of this invention to provide method and apparatus for separating multicomponent mixtures and controlling fractionation apparatus operating on such mixtures in response to such separation.

In accordance with one embodiment of this invention, a wide boiling range mixture is separated into a predetermined number of fractions having particular characteristics by passing the mixture serially through several separation zones at conditions sufficient to retain within each of said zones one of the predetermined fractions, there being one less separation zone than the number of predetermined fractions. The lowest boiling, i.e., the most volatile, fraction is removed directly as effluent from the last separation zone after which the last separation zone is isolated from the foregoing separation zones and the predetermined fraction retained in the last zone is eluted therefrom. Carrier gases then pass through all but the last separation zone so that the next lowest boiling fraction is removed from the next to the last zone and analyzed or accumulated as desired, while at the same time causing at least portions of the fractions retained in each of the respective preceding zones to migrate to the downstream separation zones. The next to the last separation zone is then isolated and the sample retained therein is eluted and analyzed, accumulated, etc., as desired. This cycle is repeated as above-described until each individual zone has been eluted.

It can be seen that due to this mode of operation each discreet separation zone is utilized several times in perfecting the separation of materials passed from the upstream separation zones. It can also be seen that the number of times which any particular zone is utilized will depend upon the total number of separation steps in the sequence and the position of the particular zone in that sequence.

In accordance with another embodiment of this invention, a multicomponent vaporizable mixture is passed to a first countercurrent separation zone in which two multicomponent mixtures of relatively narrower boiling point range are resolved and further continuously separated in diverging parallel sets of serially fed countercurrent downstream separation zones to further resolve each fraction respectively. In this embodiment, the described cycle of operation is continued until relatively pure fractions of discreet components of the feed to the first separation zone are obtained. These resolved samples can then be continuously volumetrically measured and/or analyzed to provide characterization of the multicomponent feed to the first separation zone to govern the conduct of a process, e.g., fractionation or chemical conversion phase, operating on a feed of that composition.

In yet another embodiment of this invention a multicomponent vaporizable feed mixture is passed to a first countercurrent separation zone from which the lowest boiling discreet fraction is continuously removed as bottoms product, the remaining fractions being removed as overhead product and passed serially and continuously through countercurrent series separation zones, there being one discreet fraction of the feed mixture to the first separation zone being resolved and recovered from each of said serially situated separation zones until resolution into the desired number of discreet fractions having predetermined characteristics has been achieved.

The concept of this invention can be more adequately understood by reference to the drawings of which FIG. 1 is a schematic illustration of sequentially operated series separation system; FIG. 2 is a schematic illustration of another embodiment employing parallel sets of serially divergent countercurrent continuously operated separation zones; and FIG. 3 is a schematic illustration of a third embodiment employing a multiplicity of continuously operating countercurrent serial separation zones.

The embodiment of this invention illustrated in FIG. 1 will now be described with regard to the separation and analysis of a $C_3$ to $C_{13}$ hydrocarbon fraction boiling within the range of from 42.2° C. to 234° C. It should be understood that this mode of presentation is only intended to be illustrative of the concept of this invention and is not intended to limit the scope of this invention in any respect.

A predetermined volume (0.1 cc. at 25 p.s.i.a. and 75° C.) was introduced column 7 by way of sample inlet 1, sampling valve 2 and pipe 3. Sampling valve 2 is opened to allow passage of carrier gas by way of pipe 5, valve 6 and line 14 through sampling valve, and pipe 3 into column 7 wherein the highest boiling fraction is retained while more volatile materials are passed as overhead by way of pipe 8 and valve 11 to the second separation zone 12 wherein the second highest boiling fraction is retained. The sample is further distributed throughout downstream separation zones 21, 28 and 34 in like manner while the most volatile fraction of predetermined boiling point range is allowed to exit the system by way of pipe 35, valve 36 and is passed to detector 37. This fraction is analyzed as it is removed and the analysis provided by detector 37 can be recorded to produce a chromatogram indicative of the composition and relative magnitude of the fraction.

In this particular example, the separation zones 7, 12, 21, 28 and 34 consist of ¼-inch diameter columns 1 foot in length operated at 75° C. and having relative capacities of 1, 2, 4, 8 and 16, respectively. Column packing materials were as follows:

(7) 0.63 percent w./w. squalane on 80/100 mesh Gas Chrom S;
(12) 1.25 percent w./w. squalane on 80/100 mesh Chromosorb G;
(21) 2.5 percent w./w. squalane on 80/100 Chromosorb G;
(28) 5 percent w./w. squalane on Chromosorb P;
(34) 10 percent w./w. squalane on Chromosorb P.

Gas Chrom S is commercially available from Applied Science Laboratories, P.O. Box 440, State College, Pa. 16801, and Chromosorb G and P are available from Johns Manville, Box 325, New York, N.Y. 10016. Hydrogen was employed as carrier gas during these particular operations at a rate of 60 standard cubic centimeters per minute.

In the first step of this operation where the hydrocarbon sample was swept serially throughout the several stages and detector 37, carrier gas inlet valves 4, 19, 27 and 34 and valves 9, 17, 23 and 30 were closed. In this example, the first period of operation continued for 24 seconds to effect the elution of a predetermined fraction of the most volatile components from separation zone 34 and passage thereof through detector 37 by way of line 35 and valve 36. At this time, valves 32 and 6 were closed to hold the fractions retained in zones 7, 12, 21 and 28 in their respective positions. Valve 34′ was then opened to allow the passage of carrier gas at the standard rate through zone 34 to elute the fraction retained therein and effect the passage of that fraction through detector 37.

The analyzer is continuously operated throughout the several periods of the procedure herein detailed to provide a continuous chromatogram of all materials passing from the several separation zones.

The second phase of operation, during which carrier gas was passed only through separation zone 34 as described, continued in this particular example for a period of 15 additional seconds, i.e., to an elapsed time of 39 seconds. At this time, valves 36 and 34′ were closed to isolate column 34, and valves 30 and 6 were opened to allow passage of carrier gas serially through columns 7, 12, 21 and 28 for a predetermined period of time to effect the elution of a third fraction from column 28 and passage thereof through detector 37. This third period of operation in this particular example continued for a period of 15 seconds, i.e., to an elapsed time of 54 seconds, at which time valves 25 and 6 were closed and valve 27 was opened to allow the passage of carrier gas by way of line 26 through zone 28 to effect the substantially complete elution of the fraction retained therein and its passage through detector 37. In this example, 12 seconds were required to completely elute the fraction from separation zone 28, after which time valves 30 and 27 were closed and valves 6 and 23 were opened to allow the passage of carrier gas serially through columns 7, 12 and 21 and detector 37 for a period of 44 seconds, i.e., to an elapsed time of 110 seconds, to effect a predetermined degree of migration of fractions retained in each column to downstream columns and partial elution of the sample retained in column 21 through detector 37. On the completion of this, the fifth sequence of operation, valves 16 and 6 were closed and valve 19 was opened to allow the passage of carrier gas by line 20 through column 21 for a period of 7 seconds to complete the elution of the fraction retained in column 21 and its passage through detector 37. At the termination of the sixth sequence, i.e., at 117 elapsed seconds, valves 23 and 19 were closed and valves 17 and 6 were opened allowing the passage of carrier gas through zone 7 and 12 to effect a predetermined degree of migration of the sample retained in column 7 to the downstream column 12 and the partial elution of the fraction retained in column 12 through line 18 and detector 37 for a seventh period of 38 seconds, i.e., up to an elapsed time of 155 seconds after which valves 11 and 6 were closed and valve 4 was opened to allow passage of carrier gas only through column 12 for an eighth period of 60 seconds to accomplish the substantially complete elution of the fraction retained in column 12 and its passage by way of line 18 through detector 37. After the completion of the eighth period, i.e., at 215 elapsed seconds, valves 17 and 11 were closed and valves 6 and 9 were opened to elute the highest boiling fraction retained in column 7. This valve setting was retained for a ninth period of 195 seconds, i.e., to an elapsed time of 410 seconds, to effect the substantially complete elution and analysis of the highest boiling fraction retained in column 7.

The boiling points of the highest boiling material recovered during the several periods of this embodiment were as follows: first and second, 36.3° C., third and fourth, 98.4° C., fifth and sixth, 150.5° C., seventh and eighth, 194.5° C., and ninth, 234° C.

Obviously, the size, number and composition of the separation zones, e.g., chromatographic columns, will depend on numerous factors such as, for example, the quantity and composition of the sample to be analyzed as well as the desired speed and degree of resolution. Similarly, the manner of operation of these several separation zones, e.g., the sequence by which fractions are passed therethrough, the elapsed time required in each sequence and the temperatures or ranges of temperatures in which the several columns are operated will depend upon the result desired and the characteristics of the fractions to be analyzed. For example, one or more of the columns can be temperature programmed to provide a predetermined degree of temperature variation of one or more columns during any one or more sequence of operation, thereby modifying the detention characteristics of the column or columns subject to such temperature variation. It is also possible by this method to greatly amplify the degree of resolution of a particular fraction of the total feed while either reducing the resolution of or completely eliminating other fractions of the same sample where certain components of the feed are of particular interest. Similarly, the resolution of two or more discreet fractions can be amplified while attenuating or eliminating other components of the feed sample where it is desired to ascertain the amount of one discreet fraction relative to one or more other fractions, as the total sample.

Fixed distillation points such as the 5 percent and 95 percent points are obtained in the following manner. In, for example, a three column system arranged so that the boiling point range of components eluted from the last column is wider than the expected range for the 95 to 100 percent point, and the boiling point range of components eluted from the first column is greater than the temperature range anticipated for the 0–5 percent range, the 5 percent point is determined by ratioing a running integral of the fraction eluted from the first column to the integral of the total from all three columns. The 5 percent point is determined by dividing the running integral of the chromatogram by the sum of the integrals of the entire chromatogram until a ratio representing 5 percent is reached. This point extended downward onto the horizontal scale, which is calibrated in temperature from left to right, gives the temperature at which 5 percent of the components boil over. Likewise, the 95 percent point is located by dividing the running integral of the chromatogram by the sum of the integrals of the entire chromatogram until 95 percent ratio is reached. This point extended downward onto the horizontal scale, which is calibrated in temperature from left to right, gives the temperature at which 95 percent of the components boil over.

It is generally preferred that the several columns are partition columns and are packed with particles of an inert porous solid provided with a coating of a liquid or semi-liquid material suitable for the particular fluid mixture undergoing separation. Celite-type kieselguhr and insulating brick made from the same material of a particle size between about 30 and 100 mesh, preferably between about 30 and 60 mesh, are examples of suitable inert supporting materials for use in packed partition columns. Partition columns are also known in which the inner wall of the column comprises the solid support, as is the case in instances of coated capillary chromatographic columns. A wide variety of liquid materials can be used as the stationary phase material in chromatographic partition columns. When the columns are subject to elevated temperatures, as disclosed herein, liquid materials of low volatility (high boiling point) are preferred as the stationary phase material. An example of a liquid or semi-liquid material suitable for use in partition columns useful in the present invention for separation at temperatures below about 250° C. is silicone gum or rubber. Other suitable materials are silicone oils such as General Electric Company's SF–96 (1000) silicone oil, which is useful at temperatures in the range of 0° C. to 250° C., and silicone sums such as General Electric Company's SE–30 silicone gum, which is useful at temperatures as high as 300° C. Still other examples are polyethylene, squalane, and paraffin wax. Although partition columns are preferred for the separation of hydrocarbon mixtures such as gasoline, naphtha and the like, it will be understood that insofar as the principles of the invention are concerned, the chromatographic separating columns employed can be adsorption columns. In such instances, separation of mixtures occurs as a result of differential adsorption of the components of the mixture subjected to analysis on the surfaces of an inert, porous adsorptive solid employed as the column packing. Examples of suitable adsorption column packings include diatomaceous earth, silica gel, and activated charcoal, each having a bulk density less than 0.4 gram per ml. and a particle size in the range mentioned above.

Detecting means 37 which can be, for example, a thermal conductivity cell, is provided with heating means, not shown, to maintain the detector at a constant temperature which should be sufficient to avoid condensation of the the separated components Any suitable detecting device can be used that is capable of utilizing some property of the detected component to create a signal, usually an electrical current, proportional to the concentration of that component in the effluent. Good results are obtainable by the use of conventional thermal conductivity detecting cells, as in the illustrated embodiment, but other detectors responsive to changes in the composition of the effluent gas, including as density balances, radiological ionization detectors and flame temperature detectors, can be used. Of course, if a detector that is destructive to the detected components is employed, the effluent stream of separated components can be split, with one branch being directed to the detector and the other to suitable collecting means to preserve a part thereof.

Obviously, the illustrated embodiment of this invention can be adapted for either manual or automatic sample introduction and flow variation through the use of conventional automatic sample injection means, sequence controllers, and the like.

The embodiments of this invention represented by the illustrations of FIGS. 2 and 3 are particularly adapted to the continuous analysis of multicomponent vaporizable mixtures and are uniquely suited for the analysis of feed stocks to process operations where feed forward predictive control is desirable or necessary. For example, the efficiency of operation and product distribution obtained in numerous processes such as fractionation, isomerization, alkylation, photochlorination, reforming hydrogenation and numerous others, depend at least in part on the composition of feed stocks employed. As a result, where feed stock composition is subject to variance, it is necessary to modify operating conditions in order to effect the production of one or more product streams having a predetermined desired characteristic and composition.

For example, in a typical fractionator, the feed may consist of components A–M where each component may represent either pure compounds or a group of compounds. Depending on the number of product streams and product compositions desired, the factionator will be operated to resolve the feedstock into several fractions, for example, $F_2$–$F_6$, each of which contains substantial amounts of more than one of the feed components, for example, A–H, in predictable concentrations depending on the conditions at which the fractionator is operated. For example, fraction $F_2$ may consist of subcomponents $A_2$, $B_2$ and $C_2$ representative of the concentrations of feed components A, B and C in fraction $F_2$. Likewise, fraction $F_3$ may consist of subcomponents $B_3$, $C_3$ and $D_3$ and so on for the remaining fractions produced.

From a knowledge of the concentration of components A–H in the feed, it is possible using known methods of feed forward control to adjust the operating parameters of the fractionator to accomplish a predetermined degree of feed component resolution.

We have found that an ideal method for determining the concentrations of, for example, feed components A–H consist of a number of countercurrent chromatographic columns arranged either in series as illustrated in FIG. 3 or in a series divergent countercurrent parallel configuration illustrated in FIG. 2 which are intended to be illustrative of the application of this concept to the continuous separation of the hypothetical feed mixture comprising components A–H. In the preferred embodiment, the total concentrations of these feed components are determined and this information is used to predictively control some process operating on the feedstock analyzed.

Although essentially any countercurrent chromatographic columns can be employed within the concept of this invention, the presently preferred columns are spinning band chromatographs with falling films as disclosed in FIG. 1 of U.S. Pat. No. 3,162,036. These can consist of vertically disposed cylindrical columns having a rotor mounted therein. The sorbent in the form of a liquid is admitted to the top of the column and is passed by gravity down the column and in countercurrent flow with respect to the fluid mixture or sample passing upwardly through the column. The rotor, being driven by external means, serves to rotate the sample fluid thus causing it to flow in a helical path and exposing it for a maximum length of time and path to the sorbent. As a result of the increased fluid travel promoted by this apparatus, shorter columns can be employed or improved contacting can be achieved in columns of the same dimensions. Moreover, by providing appropriate recirculating means, it is possible to bring about continuous chromatographic separation and, therefore, to effect continuous chromatographic analysis with that apparatus.

Referring now to FIG. 2, a hydrocarbon sample comprising hydrocarbons having from $C_3$ to $C_{13}$ carbon atoms and a boiling point range of from −42° C. to 234° C. is passed by way of pipe 38 to countercurrent chromatographic column 39 wherein the feed is resolved into an overhead product which exists in the column by way of pipe 40 having a boiling point range of from −42 to 174° C. and a higher boiling fraction or bottoms product having a boiling point range of from 174 to 234° C. which is passed by way of pipe 50 to column 51.

Each of the columns 39, 41, 44, 37, 51 and 54 are of the type shown in FIG. 1 of U.S. Pat. No. 3,162,036. The liquid employed is bis[2-(2-methoxyethoxy)ethyl]ether. Flow rates of liquid and gas and operating temperatures of each column are adjusted to give the following fractionations.

The higher boiling material from column 39 is resolved in column 51 into a lowest boiling fraction having a boiling point range from 214 to 234° C. and comprising primarily $C_{12}$ to $C_{13}$ hydrocarbons. More volatile components in the feed to column 51 exit the column as overhead and are passed by way of pipe 52 to column 54 wherein they are resolved into a lighter fraction having a boiling point range of from 174 to 195° C. recovered by way of pipe 55 and a higher boiling fraction having a boiling point range of from 195 to 214° C. recovered as bottoms product by way of pipe 56.

The lighter fraction resolved in column 39 and passed to column 41 by way of pipe 40 is similarly resolved into a more volatile fraction having a boiling point range of from −47 to 98° C. which is passed by way of pipe 43 to column 44 wherein two additional fractions comprising predetermined feed constutents and having boiling point ranges of from −42 to 36° C. and 36 to 98° C. are recovered by way of pipes 45 and 46, respectively. The higher boiling material recovered from column 41 having boiling point range of from 98 to 174° C. is passed by way of pipe 42 to column 47 wherein it, in similar manner, is resolved into two fractions containing predetermined components of the feed to column 39. The more volatile fraction having a boiling point range of 98 to 150° C. and comprising primarily $C_7$ to $C_9$ hydrocarbons is recovered by way of pipe 48 and a heavier fraction having a boiling point range of from 150 to 174° C. and comprising primarily $C_9$ to $C_{10}$ hydrocarbons is recovered by way of pipe 49.

In this particular example, the flow rate to column 39 by way of pipe 38 was constant at 1 cc. per minute at a temperature of 50° C. The flow rates of fractions leaving the system by way of pipes 45, 46, 48, 49, 55, 56 and 53 were also monitored continuously to provide a measurement of the relative amounts of each fraction in the feed sample. The combinations of this information with knowledge of boiling ranges of these fractions and/or actual analysis by thermal conductivity cell or flame ionization or other suitable means provides continuous, current information regarding the composition of the complex feedstock.

Obviously, the number of columns employed and the conditions at which they are operated can be varied considerably depending upon the characteristics of the feed to the first column, e.g., the sample to be analyzed, and the number of fractions into which it is desired to separate the slip stream. In addition, the degree of resolution of one or more segments of the original sample can be varied with respect to the rest of the sample where it is desired to determine the particular characteristics of those segments in more detail.

If desired, similar results can be achieved by analyzing the same feedstock by the method illustrated diagrammatically in FIG. 3. Referring now to FIG. 3, the feedstock is passed serially through six continuous countercurrents spinning band columns 58, 61, 64, 67, 70 and 73. Each of the first five columns serve to effect a resolution of one fraction corresponding to the fraction produced by the method illustrated in FIG. 2 as indicated by parenthetical numbering.

For example, the highest boiling fraction leaving column 58 in FIG. 3 by way of pipe 60 corresponds in boiling point range and carbon number range to the fraction withdrawn as bottoms product from column 51 by way of pipe 53 in FIG. 2. Similarly, the fraction recovered as overhead product from column 70 of FIG. 3 by way of pipe 71 corresponds in boiling point range and carbon number range to the fraction recovered as bottoms product from column 47 by way of pipe 49 in FIG. 2.

We claim:
1. A chromatographic method for separating a wide boiling range mixture into a predetermined number of fractions, which method comprises:
   (a) passing an amount of said mixture sequentially through a series of at least three chromatographic separation zones wherein each zone is maintained at conditions to retain a portion of said mixture, the unretained remainder being passed to the next zone,

(b) removing as effluent from the last said zone the portion of said mixture not retained by an zone,
(c) eluting the portion retained in the last zone while retaining the disposition of the remaining fractions in their respective zones,
(d) recovering the portions retained in the remaining zones by a repeated sequence comprising:
  (1) causing said remaining portions to migrate at least partially, downstream through all but the last remaining zone, and then
  (2) recovering the portion from the last remaining zone while retaining the disposition of the remaining fractions in their respective zones after the last previous migration, until all the mixture retained by any zone has been eluted.

2. The method of claim 1 wherein each of said effluents and each of said eluted portions are sequentially analyzed to determine the composition of said mixture.

3. A method for continuously analyzing multicomponent process feed streams and controlling the operation of said process in response to such analysis which comprises continuously countercurrently separating said mixture in a countercurrent separation zone to produce an overhead product and a bottoms product, each of which comprises at least one predetermined fraction of said mixture to be analyzed, further sequentially continuously separating the fractions produced by said separations to effect the resolution of said mixture into a predetermined number of fractions having predetermined composition, continuously analyzing at least one of said predetermined fractions and controlling said process in response to said analysis.

4. A method for continuously separating a multicomponent feed mixture into a predetermined number of fractions of predetermined composition and controlling a process operating on said mixture in response to analysis of said fraction, which method comprises continuously countercurrently separating said mixture in a first zone to produce an overhead product and a bottoms product, one of said products comprising one of said predetermined fractions and the other of said products comprising the remainder of said mixture, passing the remainder of said mixture serially through a predetermined number of continuously countercurrent separation zones, recovering from each of said zones one of said predetermined fractions, continuously analzying at least one of said predetermined fractions and controlling said process in response to said analysis.

5. The method of claim 4 wherein the lowest boiling point of said predetermined fractions is recovered from said first zone and one of said predetermined fractions is recovered as overhead from each remaining zone excluding the last of said separation zones wherein are produced overhead and bottoms products, each comprising one of said predetermined fractions.

6. The method of claim 2 wherein the running integral of the chromatogram is divided by the sum of the integrals of the entire chromatogram until a ratio representing 5 percent of the chromatograms is reached, and determining the temperature at this point as being the temperature at which 5 percent of the components boil over.

7. The method of claim 2 wherein the running integral of the chromatogram is divided by the sum of the integrals of the entire chromatogram until the ratio representing 95 percent of the chromatogram is reached, and determining the temperature at this point as being the temperature at which 95 percent of the components boil over.

References Cited
UNITED STATES PATENTS

| | | | |
|---|---|---|---|
| 3,096,157 | 7/1963 | Brown et al. | 23—232 |
| 3,435,659 | 4/1969 | Sternberg | 73—23.1 |

OTHER REFERENCES

Baker et al.: "Multiple Columns in Chromatography," Control Engineering, 8, 77–81 (1961).

MORRIS O. WOLK, Primary Examiner

R. E. SERWIN, Assistant Examiner

U.S. Cl. X.R.

23—232, 253, 254; 55—368; 73—23.1